United States Patent [19]

Moriyama

[11] Patent Number: 4,847,638

[45] Date of Patent: Jul. 11, 1989

[54] RECORDER

[75] Inventor: Jiro Moriyama, Yokohama, Japan

[73] Assignee: Canon Kabushiki Kaisha, Tokyo, Japan

[21] Appl. No.: 928,478

[22] Filed: Nov. 10, 1986

[30] Foreign Application Priority Data

Nov. 15, 1985 [JP] Japan ................................ 60-254859

[51] Int. Cl.[4] ................................................ G01D 15/18

[52] U.S. Cl. .................................. 346/140 R; 346/75; 400/56

[58] Field of Search ............. 346/75, 140 R, 347 AD; 400/56

[56] References Cited

U.S. PATENT DOCUMENTS

| | | | |
|---|---|---|---|
| 3,867,882 | 2/1975 | Ahlgren et al. | 101/35 |
| 4,345,263 | 8/1982 | Tazaki et al. | 346/140 R |
| 4,676,675 | 6/1987 | Suzuki et al. | 410/56 |

FOREIGN PATENT DOCUMENTS

| | | | |
|---|---|---|---|
| 0128882 | 8/1983 | Japan | 40/56 |
| 0250963 | 12/1985 | Japan | 400/56 |

*Primary Examiner*—Derek S. Jennings
*Attorney, Agent, or Firm*—Fitzpatrick, Cella, Harper & Scinto

[57] ABSTRACT

There is disclosed a recorder comprising: a print head for discharging ink toward a record medium; detection unit for detecting a thickness of the record medium; and device for adjusting a discharge timing of the ink in accordance with a signal from the detection unit.

8 Claims, 5 Drawing Sheets

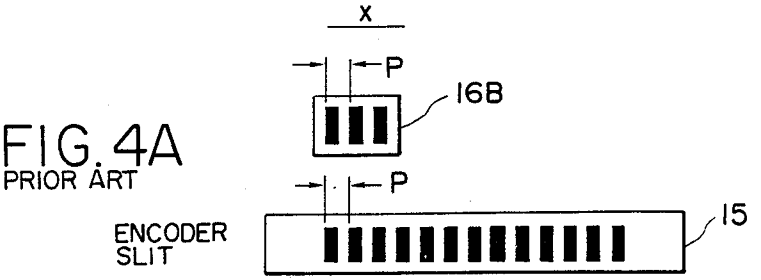
FIG. 4A
PRIOR ART
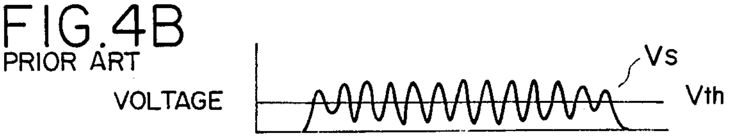
FIG. 4B
PRIOR ART
FIG. 4C
PRIOR ART
FIG. 5
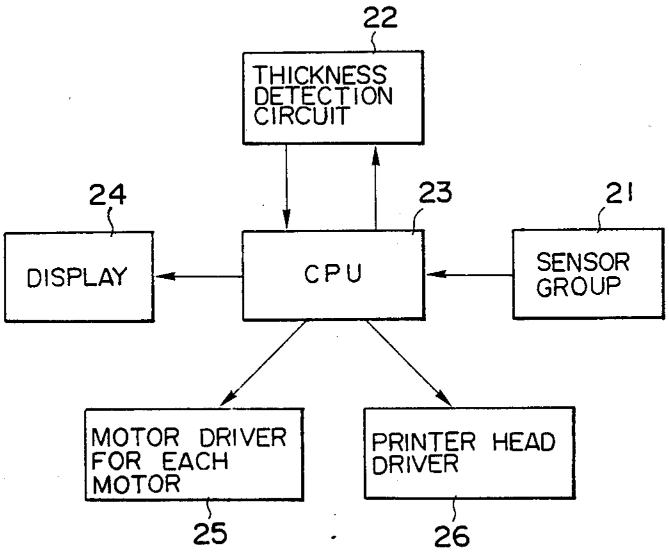

RECORDER

BACKGROUND OF THE INVENTION

1. Field of the Invention

The present invention relates to a recorder, and more particularly to an ink jet printer.

2. Related Background Art

FIG. 1 shows an example of a prior art ink jet printer. A print paper is fed by a line feed motor 7 along a platen 1. When a paper sensor 9 detects the print paper, printing is started.

An auto-cap motor 6 is driven to remove a cap 3 from a print head 2. When a cap sensor 10 detects that the cap 3 has been removed, a carriage motor 8 is driven. The rotation of the carriage motor 8 is transmitted to the printer head 2 by a pulley 4 and a belt 5 so that the print head 2 is moved. The print head 2 receives an ink discharge timing signal from an ink discharge timing detection circuit 16 to discharge ink. The ink discharge timing signal may also be used as a servo signal for the carriage motor 8 to move the print head 2 at a constant velocity. Main scan is effected by the movement of the print head 2, and sub-scan is effected by the rotation of the platen 1.

Numeral 11 denotes a home position sensor for detecting a reference position of print head 2, numeral 12 denotes an ink sensor for detecting presence or absence of ink, numeral 13 denotes an ink tank, and numeral 14 denotes a flexible tube for supplying the ink from the ink tank 13 to the print head 2.

FIG. 2 illustrates ink discharge status at a point A from an orifice of the print head 2 of the prior art printer. The print head 2 reciprocally moves at a velocity of $\pm\vec{V}$ (m/sec) at the point A. The ink is discharged at a velocity $\vec{V}$ (m/sec) from the print head 2 at the point A, perpendicularly to the plane of the print paper. When the print head 2 moves right at the velocity $\vec{V}$, the ink flies from the point A to the print paper at a velocity $\vec{V}+\vec{V}$. The ink droplet is deposited on the print paper at a point displaced by l (m) in x-direction. When the print head 2 moves left, the ink flies at a velocity $\vec{V}-\vec{V}$ and the ink droplet is deposited on the print paper at a point displaced by −l in x-direction. When a distance L between the print head 2 and the print paper, a magnitude V of the velocity $\vec{V}$ of the print head 2, that is, a speed V of the print head 2, a magnitude v of the ink discharge velocity $\vec{V}$, that is a discharge speed v of the ink are constant, a deviation between the ink deposition points in the reciprocal movement when the ink discharge timing signal is prepared at the point A is equal to 2=2LV/v(m).

FIG. 3 shows a prior art ink discharge timing detection circuit 16. FIG. 4 shows a prior art ink discharge timing pulse generation method. As a slit 16B moves in the x-direction with the print head 2, a light from a light emitting diode 16A is directed to a photo-transistor 16C through an encoder slit 15 and the slit 16B (see FIG. 4(A)). As a result, a signal Vs is produced (see FIG. 4(B)). This signal is compared with a threshold voltage Vth by a comparator 16D which produces a reshaped rectangular wave Vout (see FIG. 4(C)). P in FIG. 4 represents a slit width which may be 0.15 mm. As described above, in the bidirectional printing, there is a deviation of 2 l(m) for the ink deposition point. This deviation is compensated by discharging the ink when the print head 2 is at a point which is l behind the point A shown in FIG. 2.

The above method may work well if a record medium (print paper) of a constant thickness is always used, but if a record medium of different thickness is used, that is, if L varies by ΔL in FIG. 2, the ink deposition point deviates by 2 ΔL/v·V. As a result, if a record medium such as a post card which is thicker than a normal record medium is used, characters and image are not sharply printed.

SUMMARY OF THE INVENTION

It is an object of the present invention to provide a recorder capable of forming sharp character and image irrespective of a thickness of a record medium.

It is another object of the present invention to provide a recorder comprising a print head for discharging ink toward a record medium, detection means for detecting a thickness of the record medium and means for adjusting an ink discharge timing in accordance with the signal from the detection means.

BRIEF DESCRIPTION OF THE DRAWINGS

FIG. 5 shows a block diagram of an embodiment of a recorder of the present invention.

DETAILED DESCRIPTION OF THE PREFERRED EMBODIMENTS

The recorder of the present invention is constracted to change the ink discharge start point in accordance with a thickness of a record medium.

By changing the ink discharge timing in accordance with the thickness of the record medium, the deviation of the ink deposit points in the reciprocal movement of the carriage is minimized irrespective of the thickness of the record medium and characters and image can be sharply printed.

An embodiment of the present invention is now explained with reference to the drawings.

Figure 1:
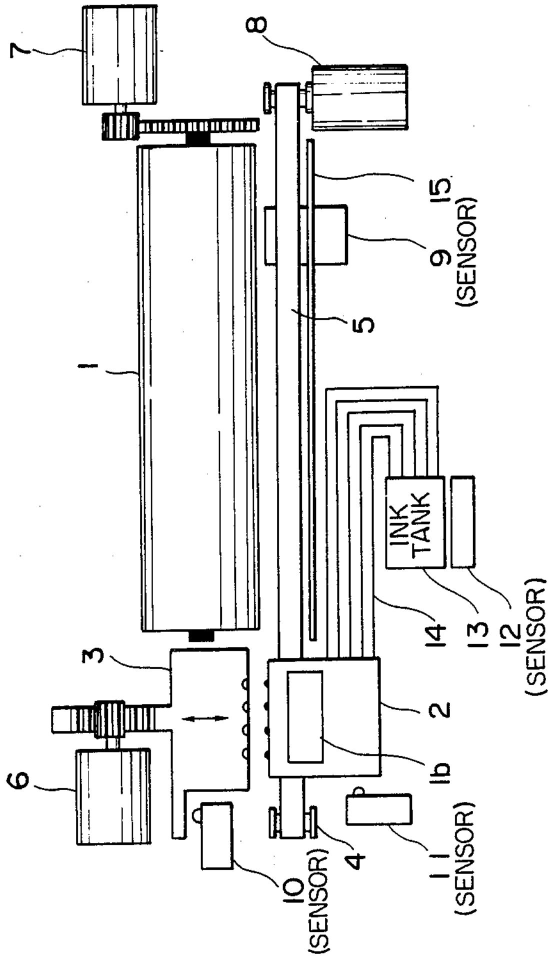
FIG. 1 PRIOR ART
FIG. 1 shows a prior art ink jet printer.
Figure 2:
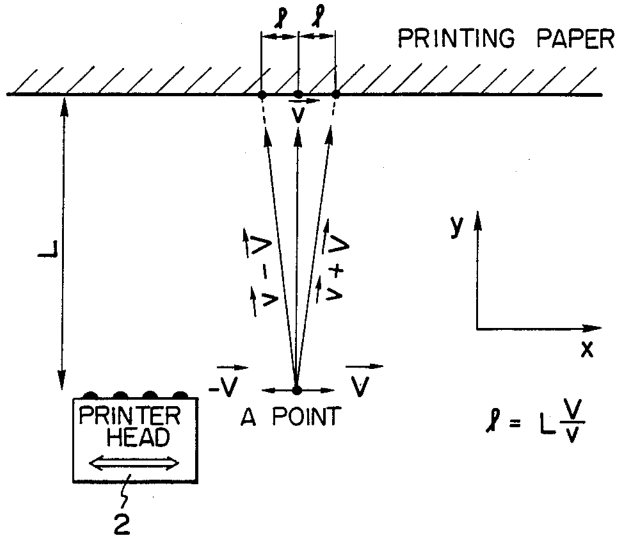
FIG. 2 PRIOR ART
FIG. 2 shows ink discharge status at a point A from an orifice of a print head of the prior art printer.
Figure 3:
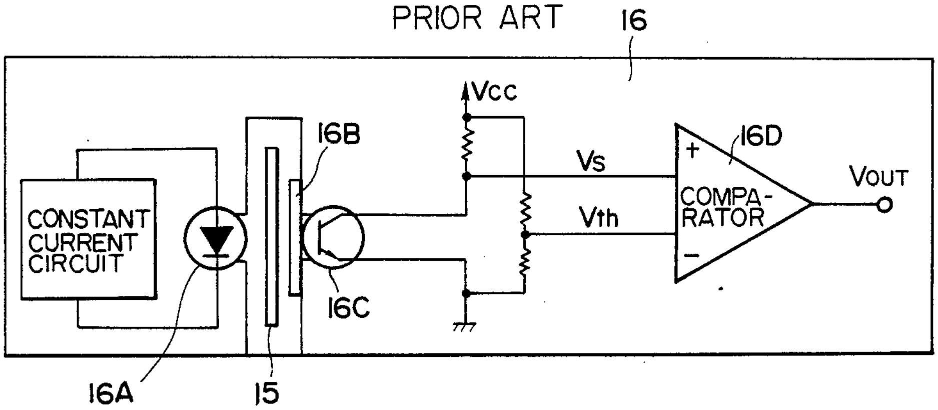
FIG. 3 PRIOR ART
FIG. 3 shows a prior art ink discharge timing detection circuit, FIGS. 4(A), (B) and (C) illustrate a prior art method for generating an ink discharge timing pulse.

FIG. 5 shows a block diagram of an embodiment of the recorder of the present invention. Numeral 21 denotes sensors similar to those used in the prior art ink jet printer shown in FIG. 1, numeral 22 denotes a thickness detection circuit for a record medium, which will be explained in detail later, and numeral 23 denotes a CPU such as a microprocessor which receives signals from the sensors 21 to instruct whether to drive or stop to motor drives 25, to instruct to a print head driver 26 in accordance with the thickness signal from the thickness detection circuit 22 to adjust an ink discharge timing. Details thereof will be explained later. Numeral 24 denotes a display for displaying the thickness of the record medium, information derived from the sensors 21 and an operation condition of the recorder.

Figure 6:
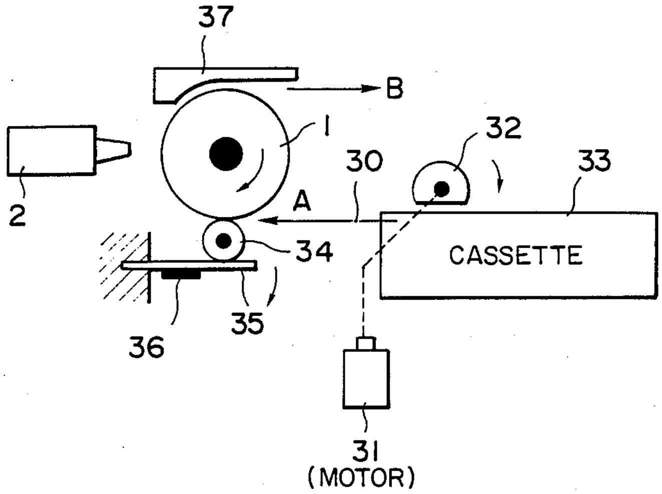
FIG. 6 shows a mechanism for detecting a thickness of a record medium in accordance with the present invention.
Figure 7:
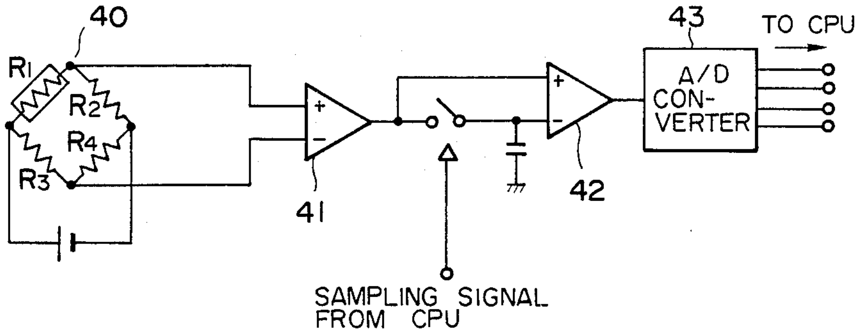
FIG. 7 shows a circuit for detecting the thickness of the record medium in accordance with the present invention.

FIG. 6 shows a mechanism for detecting the thickness of the record medium in accordance with the present invention. FIG. 7 shows a circuit for detecting the thickness of the record medium in accordance with the present invention. In FIG. 6, the record medium 30 is fed in a direction A through a clearance between a platen 1 and a pinch roller 34 and faces the printer head 2. After printing, the record medium 30 is fed in a direction B through a clearance between a record medium guide member 37 and the platen 1. More specifically, a semi-cylindrical roller 32 is rotated by a paper feed motor 31 so that the record medium 30 is fed in the direction A from a record medium cassette 33 and is fed into a clearance between the pinch roller 34 and the platen 1 which pull each other by a spring. A leaf spring 35 is flexed and a length of a strain gauge 36 changes. As a result, a resistance changes. The strain gauge 36 constitutes one side $R_1$ of a bridge of the detection circuit shown in FIG. 7. In FIG. 7, an output of the bridge circuit 40 due to the change of the strain gauge resistance $R_1$ is supplied to an amplifier 41. The output of the amplifier 41 immediately before the record medium is fed is applied to a negative terminal of an amplifier 42 by a sampling signal from the CPU, and the output of the amplifier 41 after the record medium has been fed is supplied to a positive terminal of the amplifier 42. A difference therebetween is produced at the output of the amplifier 42, and it is supplied to the CPU through an A/D converter 43. The output of the A/D converter 43 has 4 bits or 16 states. The minimum value is used to indicate non-feed of the record medium and the maximum value is used to indicate double feed of the record media. Accordingly, 14 states are actually used to indicate the thickness, although any other number of states may be used.

Figure 8A:
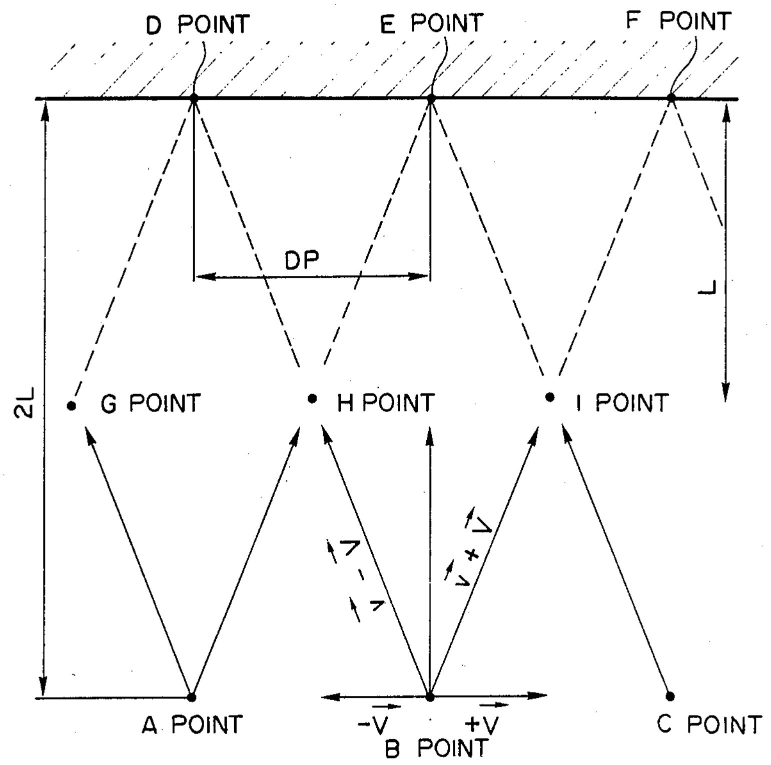
FIGS. 8A and 8B illustrate ink discharge status and ink discharge timing in accordance with the present invention.

FIG. 8 illustrates the ink discharge status and the ink discharge timing in accordance with the present invention. FIG. 8A shows ink discharging paths when a spacing between the record medium and the print head is L and 2L. Points D, E and F are target ink deposition points. A distance DP between the points D and E is equal to a pitch P of the encoder slits. When the magnitude of the velocity of the print head is V and the magnitude of the discharge velocity of the ink droplet is v, the ink is to be discharged at a point H for the spacing L and at a point A for the spacing 2L when the head moves right, in order for the ink droplet to be deposited at the point E. When the spacing is 3L, the ink discharge point is similarly displaced. The displacement is changed in accordance with the output of the A/D converter of the thickness detection circuit.

Figure 8B:
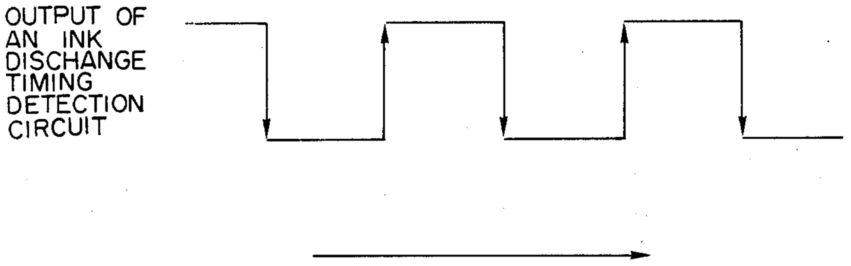

In this manner, the deviation of the ink deposition points in the reciprocal movement of the printer head can be minimized irrespective of the thickness of the record medium. In the present embodiment, the ink discharge is instructed from the CPU to the print head drivers at the rise timing of the output of the ink discharge timing detection circuit when the spacing is L as shown in FIG. 8B, and at the fall timing when the spacing is 2L. In a specific example, the CPU instructs the above timing as the timing of the pulse to be applied to the piezoelectric element for discharging the ink.

In the present embodiment, the ink discharge point is at the rise or fall point of the ink discharge timing detection circuit. Alternatively, the ink discharge point may be displaced by a timer or monostable multivibrator in the CPU. Accordingly, a fine correction may be attained irrespective of a period of the output signal of the ink discharge timing detection circuit.

When record media of different thicknesses are used and the thicknesses of the record media are known, the thickness detection may be omitted.

By changing the ink discharge timing in the main scan direction in accordance with the thickness of the record medium, the deviation of the ink deposition points in the reciprocal movement of the carriage can be minimized and the characters and image can be sharply printed on the record media of varying thickness from a thin record medium to a thick record medium such as a post card.

I claim:

1. An ink jet recorder comprising:

a print head for discharging ink toward a record medium as said print head and recording medium are moved relative to each other;

detection means for detecting a thickness of said record medium; and means for adjusting a discharge timing of the ink in accordance with a signal from said detection means to accurately place on said record medium ink discharged from said print head as said print head and said record medium are moved relative to each other.

2. An ink jet recorder according to claim 1, wherein said detection means includes a leaf spring and a strain gauge.

3. An ink jet recorder according to claim 2, wherein said detection means has a detecting circuit including a bridge circuit and a resistance of said strain gauge forms one side of said bridge circuit.

4. An ink jet recorder according to claim 3, wherein said detecting circuit has a first amplifier to which an output of said bridge circuit is applied in accordance with the change of the resistance of said strain gauge.

5. An ink jet recorder according to claim 1, wherein said adjusting means is a CPU and responds to a signal from said detection means for issuing an instruction to a printer head drive circuit.

6. An ink jet recorder according to claim 1, wherein said print head is mounted on a movable carriage which scans said record medium.

7. A recorder comprising:

a print head for discharging ink toward a record medium;

detection means including a leaf spring and a strain gauge for detecting a thickness of said record medium, said detection means having a detecting circuit including a bridge circuit in which a resistance of said strain gauge forms one side of said bridge circuit, wherein said detecting circuit includes a first amplifier to which an output of said bridge circuit is applied in accordance with the change of the resistance of said strain gauge and a second amplifier having a first terminal to which an output of said first amplifier is applied prior to the feeding of a record medium and a second terminal to which an output of said first amplifier is applied after the feeding of a record medium; and means for adjusting a discharge timing of the ink in accordance with a signal from said detection means.

8. A recorder according to claim 7, wherein said detecting circuit includes an A/D converter for performing A/D conversion of an output of said second amplifier.

* * * * *

UNITED STATES PATENT AND TRADEMARK OFFICE
CERTIFICATE OF CORRECTION

PATENT NO. : 4,847,638

DATED : July 11, 1989

INVENTOR(S) : JIRO MORIYAMA

It is certified that error appears in the above-identified patent and that said Letters Patent is hereby corrected as shown below:

SHEET 5 OF 5

FIG. 8B, "DISCHANGE" should read --DISCHARGE--.

COLUMN 1

Line 37, "velocity $\vec{V}$" should read --velocity $\vec{v}$--.
Line 41, "velocity $\vec{V}$ + $\vec{V}$." should read --velocity $\vec{v}$ + $\vec{v}$.--.
Line 44, "$\vec{V}$ - $\vec{V}$" should read --$\vec{v}$ - $\vec{V}$--.
Line 49, "velocity $\vec{V}$," should read --velocity $\vec{v}$,--.

COLUMN 2

Line 45, "constracted" should read --constructed--.
Line 63, "stop to" should read --stop the--.
Line 64, "motor drives 25," should read --motor drivers 25,--.

Signed and Sealed this

Fourteenth Day of August, 1990

Attest:

HARRY F. MANBECK, JR.

Attesting Officer

Commissioner of Patents and Trademarks